(12) United States Patent
Hemphill et al.

(10) Patent No.: US 6,858,126 B1
(45) Date of Patent: Feb. 22, 2005

(54) HIGH CAPACITANCE ANODE AND SYSTEM AND METHOD FOR MAKING SAME

(75) Inventors: Ralph Jason Hemphill, Liberty, SC (US); Thomas Flavian Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 213 days.

(21) Appl. No.: 10/289,580

(22) Filed: Nov. 6, 2002

(51) Int. Cl.[7] ............................. B23H 11/00; B23H 3/00
(52) U.S. Cl. ........................ 205/674; 205/640; 205/675; 205/684; 205/682; 205/324; 205/325; 205/326; 205/328; 205/329
(58) Field of Search ................................ 205/640, 674, 205/675, 684, 682, 324, 325, 326, 328, 329

(56) References Cited

U.S. PATENT DOCUMENTS

| | | |
|---|---|---|
| 3,662,843 A | 5/1972 | Wise |
| 3,872,579 A | 3/1975 | Papadopoulos |
| 4,213,835 A | 7/1980 | Fickelscher |
| 4,266,332 A | 5/1981 | Markarian et al. |
| 4,420,367 A | 12/1983 | Locher |
| 4,474,657 A | 10/1984 | Arora |
| 4,518,471 A | 5/1985 | Arora |
| 4,525,249 A | 6/1985 | Arora |
| 4,541,037 A | 9/1985 | Ross et al. |
| 4,593,343 A | 6/1986 | Ross |
| 4,663,892 A | 5/1987 | Smith |
| 4,696,082 A | 9/1987 | Fonfria et al. |
| 5,522,851 A | 6/1996 | Fayram |
| 5,584,890 A | 12/1996 | MacFarlane et al. |
| 5,901,032 A | 5/1999 | Harrington et al. |
| 5,935,408 A * | 8/1999 | Kinard et al. ............... 205/234 |
| 6,168,706 B1 | 1/2001 | Hemphill et al. |
| 2002/0043168 A1 * | 4/2002 | Mayers et al. .............. 101/395 |

* cited by examiner

*Primary Examiner*—Wesley A. Nicolas
(74) *Attorney, Agent, or Firm*—Steven M. Mitchell

(57) ABSTRACT

A method of producing electrodes for electrolytic capacitors by etching metal foil in a low pH etching electrolyte is disclosed. The low pH electrolyte is an aqueous solution, which comprises hydrochloric acid, glycerol, sodium perchlorate or perchloric acid, sodium persulfate and titanium (111) chloride. Anode foils etched according to the method of the invention maintain high capacitance gains, electrical porosity and strength. The electrical porosity of the etched foils is sufficiently high such that the overall Equivalent Series Resistance (ESR) is not increased in multilayer anodes configurations. Also described is a low pH electrolyte bath composition. Anode foils etched according to the present invention and electrolytic capacitors incorporating the etched anode foils are also disclosed.

20 Claims, 1 Drawing Sheet

HIGH CAPACITANCE ANODE AND SYSTEM AND METHOD FOR MAKING SAME

BACKGROUND OF THE INVENTION

1. Field of the Invention

Figure 1:
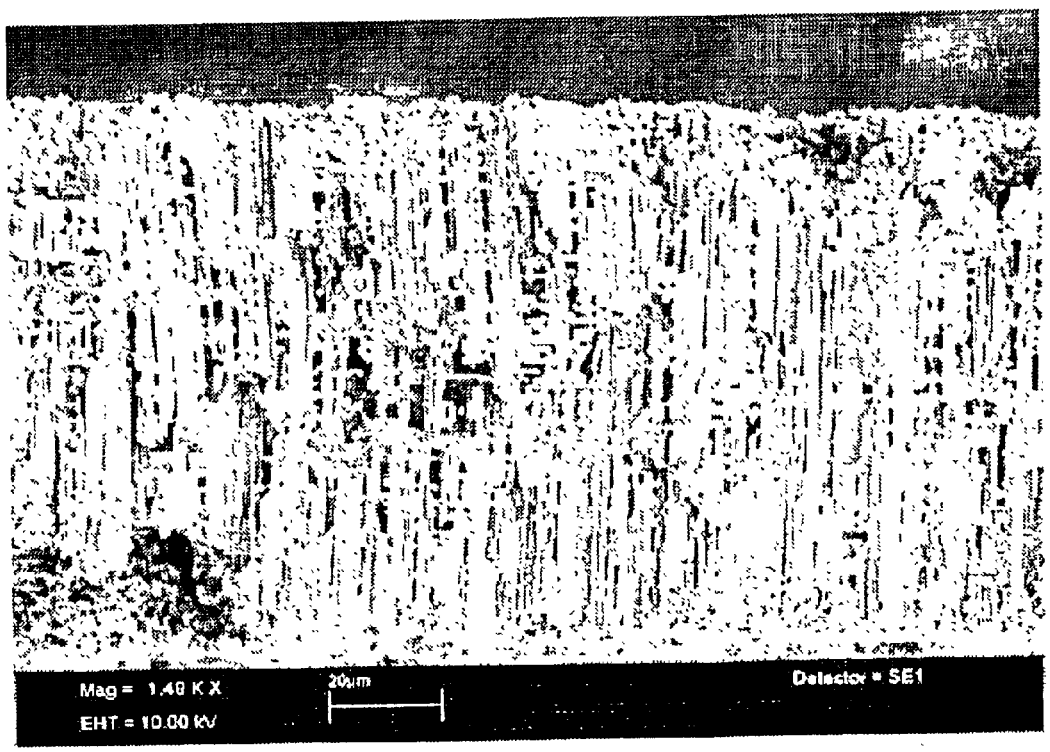

The invention relates generally to the field of capacitors, and more particularly, to a system and method for producing electrodes for capacitors.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator (ICD), also referred to as an implantable defibrillator, since the high voltage capacitors used to deliver the defibrillation pulse can occupy as much as one third of the ICD volume.

Electrolytic capacitors are used in ICDs because they have the most nearly ideal properties in terms of size and ability to withstand relatively high voltage. Conventionally, an electrolytic capacitor includes an etched aluminum foil anode, an aluminum foil or film cathode, and an interposed kraft paper or fabric gauze separator impregnated with a solvent-based liquid electrolyte. The electrolyte impregnated in the separator functions as the cathode in continuity with the cathode foil, while an oxide layer on the anode foil functions as the dielectric.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of the aluminum anode foil results in increased capacitance per unit volume of the electrolytic capacitor. By electrolytically etching aluminum foils, an enlargement of a surface area of the foil will occur. As a result of this enlargement of the surface area, electrolytic capacitors, which are manufactured with the etched foils, can obtain a given capacity with a smaller volume than an electrolytic capacitor, which utilizes a foil with an unetched surface.

In a conventional electrolytic etching process, surface area of the foil is increased by removing portions of the aluminum foil to create etch tunnels. While electrolytic capacitors having anodes and cathodes comprised of aluminum foil are most common, anode and cathode foils of other conventional valve metals such as titanium, tantalum, magnesium, niobium, zirconium and zinc are also used.

U.S. Pat. No. 4,213,835 to Fickelscher discloses a method for electrolytically etching an aluminum foil. This method involves a pari-potentiostatic etching technique using a constant anode potential in a traveling neutral pH bath containing chloride ions. Foils are thus provided with tunnel densities greater than $10^7$ tunnels/cm$^2$ of foil surface.

U.S. Pat. No. 4,420,367 to Locher discloses a similar method for etching aluminum foil for electrolytic capacitors. In a first etching step, the tunnels are formed electrolytically, as described above, using a neutral pH etching solution. In a second etching step, the tunnels are enlarged using a non-electrolytic process, which involves one or more chemical etching stages.

U.S. Pat. Nos. 4,474,657, 4,518,471 and 4,525,249 to Arora disclose the etching of aluminum electrolytic capacitor foil by passing the foil through an electrolyte bath. The preferred bath contains 3% hydrochloric acid and 1% aluminum as aluminum chloride. The etching is carried out under a direct current (DC) and at a temperature of 75° C. U.S. Pat. No. 4,518,471 adds a second step where the etched foil is treated in a similar bath with a lower current density and at a temperature of 80–82.5° C. U.S. Pat. No. 4,525,249 adds a different second step, where the etched foil is treated in a bath of 8% nitric acid and 2.6% aluminum as a nitrate, at a temperature of 85° C.

U.S. Pat No. 5,901,032 to Harrington, describes a neutral etching solution that consists of sodium chloride, sodium perchlorate, and sodium persulfate.

Typically, the anode foil element in an ICD is comprised of a single or double layer of etched foil. U.S. Pat. No. 5,594,890 to MacFarlane and Lunsmann describes a double layer or greater etched foil. While this multiple anode stack configuration allows for higher energy storage densities, the drawback is that the Equivalent Series Resistance (ESR) of the capacitor increases in the multilayer design. An etching process is needed that produces anode foils of high capacitance, but also, one that produces foils that when stacked in a multilayer design, lead to capacitors with reduced ESR.

SUMMARY OF THE INVENTION

The present invention is directed to a method of creating porous electrode foil for use in multiple anode stack configuration electrolytic capacitors, in order to reduce the equivalent series resistance (ESR) of such multiple electrode stack configurations without sacrificing capacitance. An electrolytic capacitor incorporating the etched anode foil of the present invention can be used in an implantable cardioverter defibrillator (ICD).

A first embodiment of the present invention is directed to a method of producing an electrode for a capacitor from a foil. The method comprises, first, placing a foil in an acidic electrolyte bath composition, which comprises titanium (III) chloride, hydrochloric acid, sodium perchlorate, sodium persulfate and glycerol and, second, passing a direct current (DC) charge through the foil. The foil is immersed in the acidic electrolyte bath when passing the charge so that the foil is etched.

In a second embodiment, the invention is directed to an electrochemical bath electrolyte composition comprising titanium (III) chloride, hydrochloric acid, sodium perchlorate or perchloric acid, sodium persulfate and glycerol.

In a third embodiment, the invention is directed to an etched anode foil made by the method described above.

In a fourth embodiment, the invention is directed to an electrolytic capacitor comprising an aluminum anode foil etched according to the method described above.

BRIEF DESCRIPTION OF THE DRAWINGS/FIGURES

FIG. 1 shows a Scanning Electron Microscope (SEM) image of a cross section of an aluminum anode foil etched according to the present invention.

DETAILED DESCRIPTION OF THE INVENTION

A first embodiment of the invention is directed to a method of producing an electrode for a capacitor from a foil. The electrode can function as an anode or a cathode in the capacitor. Preferably, the electrode functions as an anode. The capacitor produced by the method of the present invention is any type of capacitor capable of storing electrical charge, preferably an electrolytic capacitor.

The foil that is etched is made of metal. The invention allows for the use of a variety of metal foils including, but not limited to, aluminum, titanium, tantalum, magnesium, niobium, zirconium, zinc or an alloy containing two or more metals. Preferably, the metal foil is an aluminum foil. The foil is preferably made of highly pure crystalline aluminum. Preferably, the aluminum is at least about 99.98% pure. In addition, the aluminum has at least about 80% crystal texture in the (1, 0, 0) direction. The aluminum foil has thickness in the range from about 85 microns to about 120 microns. Such foils are well-known in the art and are readily available from commercial sources.

According to the method of the present invention, the foil is placed in an acidic electrolyte composition. An electrochemical bath contains the electrolyte bath composition. The electrochemical bath comprises an anode and cathode portion, separated by an ion-exchange membrane. Preferably, the acidic electrolyte bath composition of the present invention is placed in the anode portion of the electrochemical bath. The foil is connected to a charge source. The foil is then etched by passing a direct current (DC) charge through the foil. The DC charge is monitored as it passes through the foil. The etching of the foil is monitored and stopped when a predetermined amount of charge has passed through the foil. The DC current density passed through the foil is in the range of about 0.15 to about 0.30 amps/cm$^2$ and, preferably, about 0.20 to about 0.25 amps/cm$^2$. The electrolyte bath composition is maintained at a predetermined temperature during etching, which is in the range from about 75° C. to about 90° C., preferably between about 77° C. and about 85° C.

A second embodiment of the present invention is directed to an acidic bath electrolyte composition. The electrolyte bath composition of the present invention is an acidic electrolyte. Acidic is used herein to refer to a bath composition that has a pH in the range from about zero to about seven. The electrolyte composition comprises an acid such as hydrochloric acid. Alternative acids for use in the electrolyte bath composition include but are not limited to mineral acids such as sulfuric, nitric, hydrobromic, and hydrofluoric acid; and other inorganic acids such as phosphoric acid or organic acids such as formic, acetic, chloroacetic, trichloroacetic and trifluoroacetic acid Preferably, the bath composition comprises about 0.4 to about 1.0% by weight hydrochloric acid. The pH of the electrolyte composition, adjusted by the addition of the acid, is in the range of about two to five, preferably around three to four.

The composition also comprises an oxidizer and alternatively a combination of oxidizers. Oxidizers for use in the present invention include but are not limited to sodium persulfate, sodium pyrosulfate, iodic acid, iodine pentoxide, iodine peroxide, hydrogen peroxide and sodium perchlorate. Preferably, a combination of sodium persulfate and sodium perchlorate is used. The amount of sodium persulfate is in the range of about 100 to about 8000 parts per million (PPM), preferably about 1000 to about 6000 PPM, and most preferably about 3500 to about 4500 PPM The amount of sodium perchlorate is in the range of about 1.5 to about 10% by weight, preferably about 3.0 to about 7.0% by weight, and most preferably about 5.0 to about 5.5% by weight.

The electrolyte bath composition comprises glycerol in the range of about one to about five % by weight, preferably about three % by weight.

The electrolyte bath composition comprises titanium (III) chloride in the range of about 250 to about 800 PPM, preferably about 300 to 700 PPM and most preferably from about 450 to 550 PPM.

A most preferred aqueous electrolyte bath composition comprises about 3% by weight glycerol, about 5.2% by weight sodium perchlorate, about 0.8% by weight hydrochloric acid, about 4000 PPM sodium persulfate and about 500 PPM titanium (III) chloride.

Compared to methods that utilize a neutral etch electrolyte, the method of the present invention allows for the use of higher current densities and fewer etch coulombs to achieve similar capacitance gains in etched foils The method described herein also reduces the time required to etch a foil by approximately 50%, as compared to methods utilizing a neutral etch electrolyte. Because fewer etch coulombs are used to produce high gain and high electrical porosity etched foils, the method described herein also produces stronger foils than methods using the neutral etch electrolyte. This is evidenced by the punch yields. The punch yield represents the number of anode foils obtained from a bulk sheet of etched foil that meet minimum requirements of strength, capacitance and porosity. The method of the present invention increases the anode punch yields on etched aluminum foils by about 33% compared to methods using a neutral etch electrolyte.

A third embodiment of the invention is directed toward an etched anode foil produced by the method of the present invention Foils etched in accordance with the method of the present invention exhibit both high capacitance and high electrical porosity, while maintaining high strength. FIG. 1 shows the cross section of an etched anode foil produced according to the present invention. The image was obtained using a Scanning Electron Microscope (SEM). The foil has a large number of vertical tunnels per cm$^2$. The large number of vertical tunnels maintains high electrical porosity of the foil and allows for a number of anode foils to be stacked without greatly increasing the overall Equivalent Series Resistance (ESR).

The etched foil is optionally further processed in a widening step. Foils are widened in a chloride or nitrate containing electrolyte solution known to those skilled in the art, such as that disclosed in U.S. Pat. Nos. 3,779,877 and 4,525,249. The foil is then dipped into a deionized water bath at a temperature of 80° C. to 100° C., preferably 95° C., to form a hydrate on the foil surface.

Next, the foils are optionally further processed in a forming solution. A barrier oxide layer is electrochemically formed onto one or both surfaces of the metal foil, sufficiently thick to support the intended use voltage. The foil is placed into a forming solution, including but not restricted to a solution based on azelaic acid, sebacic acid, suberic acid, adipic acid, dodecanedioic acid, citric acid or other related organic acids and salts. Preferably a citric acid solution is used at a temperature of about 80° C. to 100° C., preferably 85° C., at a current density of about 1 mA/cm$^2$ to 40 mA/cm$^2$, preferably 16 mA/cm$^2$ A formation voltage of about 50 to 1000 Volts, preferably 445 V, can be applied to the foil to form the barrier oxide layer. The barrier oxide layer provides a high resistance to current passing between the electrolyte and the metal foils, also referred to as the leakage current. A high leakage current can result in poor performance and reliability of an electrolytic capacitor. In particular, a high leakage current results in a greater amount of charge leaking out of the capacitor once it has been charged.

A heat treatment of about 500° C. ±20° C. may be applied to the foil following formation for about one to about ten minutes, preferably about four minutes. The foil is then returned to the forming solution and allowed to soak with no applied potential for about one to about ten minutes, preferably about two minutes. A second formation is performed in the same electrolytic forming solution at a temperature in the range of about 80° C. to 100° C., preferably 85° C., and at a potential of about 435 Volts.

Next, the foils are optionally dipped in a suitable low concentration oxide-dissolving acid solution including but not restricted to phosphoric acid, fornic acid, acetic acid, citric acid, oxalic acid, and acids of the halides. Preferably phosphoric acid is used at a concentration of about 1% to 10%, preferably a concentration of about 2%, at a temperature of about 60° C. to 90° C., preferably about 70° C., for a time of about one to about ten minutes, preferably about four minutes.

Finally, the foils are optionally reformed, in a third formation step, at a voltage of about 435 Volts in a suitable forming solution, as discussed above, at a high temperature, preferably about 80° C. to about 100° C., more preferably about 85° C.

In a fourth embodiment, the present invention is directed toward an electrolytic capacitor comprising etched aluminum anode foils, which have been etched using methods and compositions of the present invention. After etching the anode foils, such capacitors can be assembled using any suitable methods known in the art. Examples of such methods are disclosed, for example, in U.S. Pat. No. 4,696,082 to Fonfria et al., U.S. Pat. No. 4,663,892 to Kenmochi, U.S. Pat. No. 3,872,579 to Papadopoulos, U.S. Pat. No. 4,541,037 to Ross et al., U.S. Pat. No. 4,266,332 to Markarian et al., U.S. Pat. No. 3,622,843 to Vermiyea et al., and U.S. Pat. No. 4,593,343 to Ross.

Electrolytic capacitors manufactured with anode foils etched according to the present invention may be utilized in ICDs, such as those described in U.S. Pat. No. 5,522,851 to Fayram, incorporated herein by reference. The increased capacitance per unit volume of the electrolytic capacitor will allow for a reduction in the size of the ICD.

Having now generally described the invention, the same will be more readily understood through reference to the following examples which are provided by way of illustration, and are not intended to be limiting of the present invention.

EXAMPLE 1

Sample aluminum foils were etched in an electrolyte bath composition comprising 0.8% hydrochloric acid and 5000 PPM sodium persulfate. Each foil was etched with 40 Coulombs and widened with 70 Coulombs at a current density of 0.15 amps/cm$^2$ for eight minutes and 40 seconds. The amount of hydrochloric acid and sodium persulfate were held constant while the amount of sodium perchlorate and glycerol were varied, along with the temperature of the electrolyte composition. The foils were finally formed to 449 Volts each. The capacitance of the etched foils are given in Table 1.

TABLE 1

Optimizing Etch Conditions in a Low pH Etch Solution

| Sample # | NaClO$_4$ (wt. %) | Glycerol (wt. %) | Temperature (° C.) | Current Density (amps/cm$^2$) | Capacitance ($\mu$F/cm$^2$) |
|---|---|---|---|---|---|
| 172 | 4.2 | 0 | 80 | 0.20 | 1.17 |
| 173 | 4.2 | 0 | 85 | 0.10 | 1.12 |
| 174 | 4.2 | 0 | 85 | 0.30 | 1.27 |
| 175 | 4.2 | 0 | 90 | 0.20 | 1.19 |
| 176 | 4.2 | 5 | 80 | 0.30 | 1.25 |
| 177 | 4.2 | 5 | 80 | 0.10 | 1.16 |
| 178 | 4.2 | 5 | 85 | 0.20 | 1.25 |
| 179 | 4.2 | 5 | 85 | 0.20 | 1.26 |
| 180 | 4.2 | 5 | 85 | 0.20 | 1.23 |
| 181 | 4.2 | 5 | 90 | 0.10 | 0.91 |
| 182 | 4.2 | 5 | 90 | 0.30 | 1.19 |
| 183 | 4.2 | 10 | 80 | 0.20 | 1.23 |
| 184 | 4.2 | 10 | 85 | 0.10 | 1.08 |
| 185 | 4.2 | 10 | 85 | 0.30 | 1.18 |
| 186 | 4.2 | 10 | 90 | 0.20 | 1.13 |
| 188 | 2.7 | 0 | 85 | 0.20 | 1.11 |
| 189 | 2.7 | 5 | 80 | 0.20 | 1.13 |
| 190 | 2.7 | 5 | 85 | 0.10 | 1.06 |
| 191 | 2.7 | 5 | 85 | 0.30 | 1.19 |
| 192 | 2.7 | 5 | 90 | 0.20 | 1.23 |
| 193 | 2.7 | 10 | 85 | 0.20 | 1.17 |
| 195 | 5.7 | 0 | 85 | 0.20 | 1.19 |
| 196 | 5.7 | 5 | 80 | 0.20 | 1.25 |
| 197 | 5.7 | 5 | 85 | 0.30 | 1.19 |
| 198 | 5.7 | 5 | 85 | 0.10 | 1.07 |
| 199 | 5.7 | 5 | 90 | 0.20 | 1.03 |
| 200 | 5.7 | 10 | 85 | 0.20 | 1.10 |

EXAMPLE 2

Sample aluminum foils were etched in an electrolyte bath composition comprising about 0.8% by weight hydrochloric acid, about 0.5% by weight sodium persulfate, about 3% by weight glycerol, about 4.2% by weight sodium perchlorate and about 500 PPM titanium (III) chloride. Each foil was etched with a current density of 0.25 amps/cm$^2$. The temperature of the electrolyte bath composition was held constant at about 84° C. After etching, the foils were widened using about 74 Coulombs at about 0.15 amps/cm$^2$ for about seven minutes and forty seconds. The foils were finally formed to about 445 Volts each. Two foils were etched per sample. The results for this Example are shown in 2.

TABLE 2

Optimizing Etch Conditions in a Low pH Solution Comprising Titanium (III) Chloride

| Sample # | Etch Coulombs | Etch Time (sec) | Capacitance ($\mu$F/cm$^2$) | | Form Coulombs | |
|---|---|---|---|---|---|---|
| | | | Foil 1 | Foil 2 | Foil 1 | Foil 2 |
| 134 | 5 | 20 | 0.671 | 0.552 | 212 | 216 |
| 135 | 10 | 40 | 0.868 | 0.860 | 354 | 360 |
| 136 | 15 | 60 | 0.994 | 0.990 | 433 | 436 |
| 143 | 20 | 80 | 1.067 | 1.051 | 477 | 482 |
| 138 | 25 | 100 | 1.087 | 1.094 | 503 | 505 |
| 139 | 30 | 120 | 1.116 | 1.138 | 524 | 516 |
| 140 | 35 | 140 | 1.138 | 1.149 | 532 | 532 |
| 141 | 40 | 160 | 1.150 | 1.172 | 551 | 544 |
| 142 | 45 | 180 | 1.174 | 1.171 | 547 | 552 |

EXAMPLE 3

Sample aluminum foils were etched in an electrolyte bath composition comprising about 0.8% by weight hydrochloric acid, about 5000 PPM sodium persulfate, about 3% by weight glycerol, about 5.2% by weight sodium perchlorate and about 500 PPM titanium (III) chloride. Each foil was etched with about 45 Coulombs of charge at a current density of about 0.22 amps/cm². The foils were etched for three minutes and twenty five seconds, which resulted in about 55.4 amps of current being used in the etch process. The temperature of the electrolyte bath composition was held constant at about 80° C. After etching, the foils were widened using about 78 Coulombs of charge at a current density of about 0.15 amps/cm². The foils were widened for about eight minutes and forty seconds, which resulted in about 38 1 amps being used in the etch process. Two foils were etched and widened per sample number. In sample 156, an additional 500 PPM of titanium (III) chloride was added to the electrolyte bath composition before etching. The total coulombs used in the forming process are given in Table 3. Also shown in the table are the resulting capacitance values for the films and the dissipation factor. The dissipation factor, given as a percent, was calculated according to the formula below:

$$D.F. = 2\pi (Frequency)(Capacitance)(E.S.R.)$$

wherein the Frequency is 120 HZ at a temperature of 25° C.

TABLE 3

| Sample # | Total Formation Coulombs | | Capacitance ($\mu F/cm^2$) | | Dissipation Factor (%) | |
|---|---|---|---|---|---|---|
| | Foil 1 | Foil 2 | Foil 1 | Foil 2 | Foil 1 | Foil 2 |
| 152 | | | 1.260 | 1.242 | 4.6 | 4.5 |
| 153 | 597 | 623 | 1.213 | 1.193 | 0.4 | 4.5 |
| 154 | 567 | 568 | | | | |
| 155 | 629 | 633 | 1.193 | 1.204 | 4.5 | |
| 156 | 585 | 589 | 1.183 | 1.182 | 7.2 | 4.4 |
| 157 | 601 | 588 | 1.186 | 1.194 | 4.5 | 4.3 |
| 158 | 583 | 572 | 1.196 | 1.208 | 5.3 | 4.2 |
| 159 | 586 | 553 | 1.192 | 1.169 | 4.0 | 4.4 |

EXAMPLE 4

Sample foils were etched under the conditions outlined in Example 3. The results are shown in Table 4. The foil capacitance is given, along with the punch yield for the foil. The final anode capacitance is also given along with the Equivalent Series Resistance (ESR).

TABLE 4

| Sample # | Foil Cap ($\mu F/cm^2$) | Punch Yield | Anode Cap ($\mu F$) | ESR ($\Omega$) |
|---|---|---|---|---|
| 161 | 1.294 | 22 | | |
| 162 | 1.230 | 24 | | |
| 163 | 1.179 | 23 | 22.703 | 7.184 |
| 164 | 1.214 | 24 | | |
| 165 | 1.194 | 24 | | |
| 166 | 1.210 | 23 | 22.971 | 8.152 |
| 167 | 1.214 | 24 | 22.445 | 8.140 |
| 168 | 1.222 | 24 | 22.640 | 7.910 |
| 177 | 1.206 | 23 | 22.665 | 8.662 |
| 178 | 1.230 | 24 | 23.446 | 8.755 |
| 179 | 1.214 | 23 | 23.369 | 6.240 |
| 180 | 1.214 | 24 | 23.062 | 7.186 |
| 181 | 1.218 | 24 | 22.979 | 7.612 |
| 182 | 1.238 | 24 | 23.032 | 8.303 |
| 183 | 1.210 | 24 | | |
| 184 | 1.218 | 24 | | |
| 185 | 1.210 | 21 | 22.479 | 10.92 |
| 186 | 1.218 | 24 | | |
| 187 | 1.274 | 23 | 24.052 | 11.16 |

While the invention has been particularly shown and described with reference to preferred embodiments thereof, it will be understood by those skilled in the art that various changes in form and details may be made therein without departing from the spirit and the scope of the invention.

What is claimed is:

1. A method of producing an electrode for a capacitor, comprising:

(a) placing a foil in an acidic electrolyte bath composition comprising titanium (III) chloride, hydrochloric acid, sodium perchlorate, sodium persulfate and glycerol; and (b) passing a direct current (DC) charge through said foil, wherein said foil is immersed in said acidic electrolyte bath when passing said charge, such that said foil is etched.

2. The method of claim 1, wherein said placing step comprises:

placing said anode foil in an acidic electrolyte bath composition comprising titanium (III) chloride in the range of 250–800 PPM.

3. The method of claim 1, wherein said placing step comprises:

placing an aluminum, zinc, zirconium, tantalum, magnesium, niobium, or a combination metal alloy foil in said acidic electrolyte bath composition.

4. The method of claim 3, wherein said placing step comprises:

placing said anode foil in said acidic electrolyte bath composition, wherein said acidic electrolyte bath composition comprises titanium (III) chloride in the range of 450–550 PPM.

5. The method of claim 4, wherein said placing step comprises:

placing said anode foil in said acidic electrolyte bath composition, wherein said acidic electrolyte bath composition further comprises glycerol in the range of 1–5 weight percent.

6. The method of claim 5, wherein said placing step comprises:

placing said anode foil in said acidic electrolyte bath composition, wherein said acidic electrolyte bath composition comprises sodium perchlorate in the range of 1.5–10 weight percent.

7. The method of claim 6, wherein said placing step comprises:

placing said anode foil in said acidic electrolyte bath composition, wherein said acidic electrolyte bath composition comprises hydrochloric acid in the range of 0 4–1.0 weight percent.

8. The method of claim 7, wherein said placing step comprises:

placing said anode foil in said acidic electrolyte bath composition, wherein said acidic electrolyte bath composition comprises sodium persulfate in the range of 100–8000 PPM.

9. The method of claim 8, wherein said placing step comprises:

placing said anode foil in said acidic electrolyte bath composition, wherein said acidic electrolyte bath composition is maintained at a temperature in the range of 75–90° C.

10. The method of claim 1, wherein said passing step comprises:

passing a direct current (DC) charge in the range of 0.15 to 0.3 amps/cm² through said anode foil.

11. The method of claim 1, further comprising a step, after said passing step, of:

said passing step, of:
widening said foil.

12. The method of claim 11, further comprising a step, after said passing step, of:
forming said foil.

13. An electrochemical bath electrolyte composition comprising:
titanium (III) chloride;
hydrochloric acid;
sodium perchlorate or perchloric acid;
sodium persulfate; and
glycerol.

14. The electrolyte composition of claim 13, wherein said titanium (III) chloride comprises:
titanium (III) chloride in the range of 250–800 PPM.

15. The electrolyte composition of claim 13, wherein said titanium (III) chloride comprises:
titanium (III) chloride in the range of 450–550 PPM.

16. The electrolyte composition of claim 15, wherein said glycerol comprises:
glycerol in the range of 1–5 weight percent.

17. The electrolyte composition of claim 16, wherein said sodium perchlorate comprises:
sodium perchlorate in the range of 1.5–10 weight percent.

18. The electrolyte composition of claim 17, wherein said hydrochloric acid comprises:
hydrochloric acid in the range of 0.4–1.0 weight percent.

19. The electrolyte composition of claim 18, wherein said sodium persulfate comprises:
sodium persulfate in the range of 100 to 8000 PPM sodium persulfate.

20. The electrolyte bath composition of claim 13, comprising 3 wt. % glycerol, 5.2 wt. % sodium perchlorate, 0.8 wt. % hydrochloric acid, 4000 PPM sodium persulfate and 500 PPM titanium (III) chloride.

* * * * *